United States Patent Office 2,915,374
Patented Dec. 1, 1959

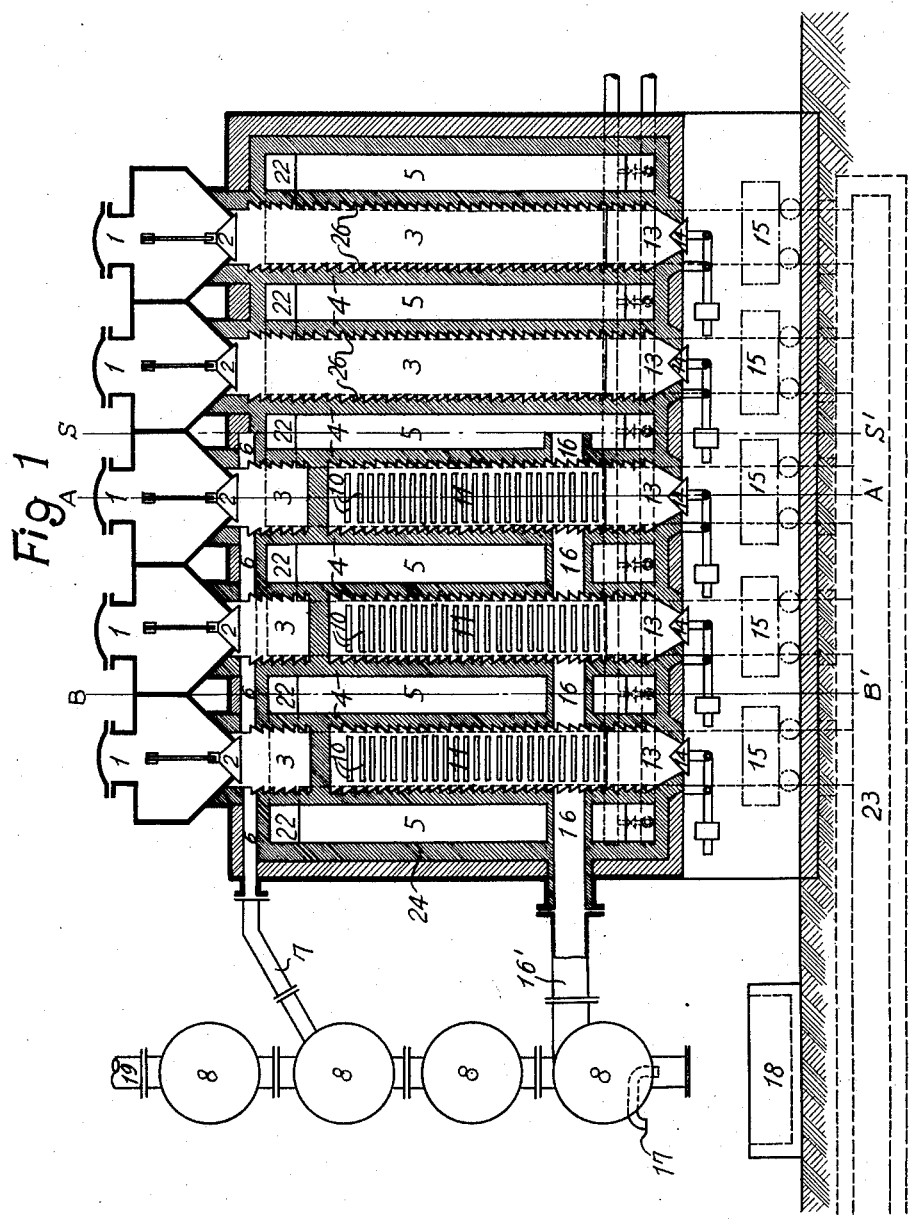

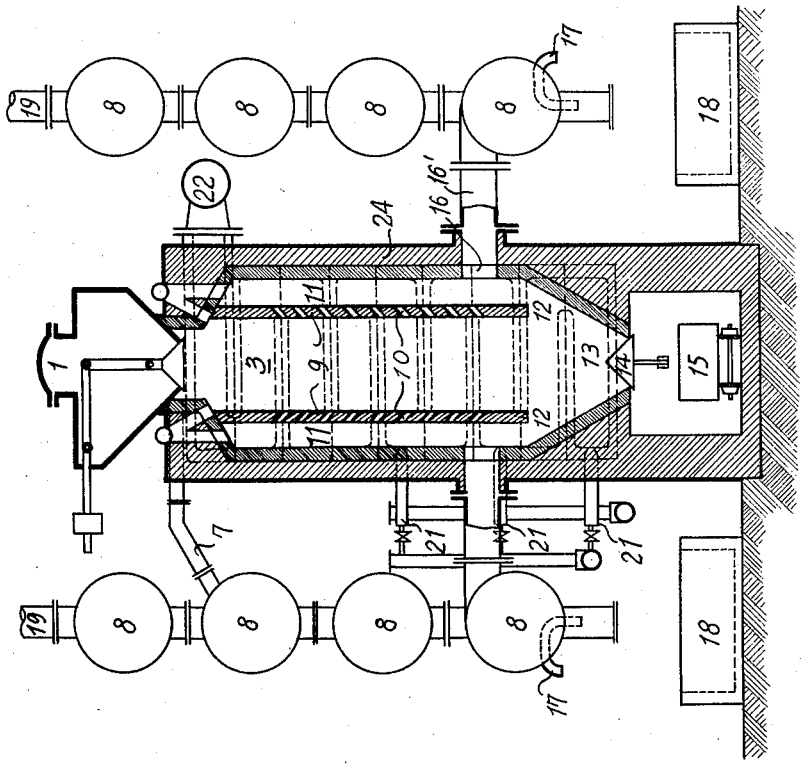

2,915,374

FURNACE FOR EXTRACTING SULPHUR

Yokota Nobuo, Marugame-shi, Kagawa-ken, Japan, assignor to Shikoku Kasei Kogyo Co., Ltd., Marugame-shi, Kagawa-ken, Japan, a company of Japan Application October 8, 1954, Serial No. 461,171

4 Claims. (Cl. 23—277)

This invention relates to improvements in furnaces for extracting sulphur from sulphureous ore.

An object of this invention is to provide an improved furnace which economically extracts sulphur on a large scale.

Another object is to provide an improved furnace with reduced heat losses and which is easily operated.

Another object is to provide an improved furnace which has great productive capacity and high heat efficiency.

Other objects will become hereinafter apparent.

Figure 3:
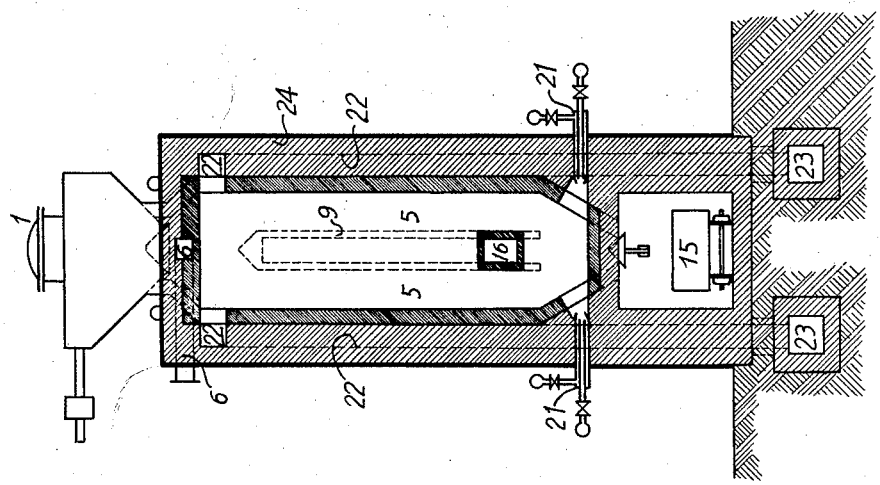
Figure 2:
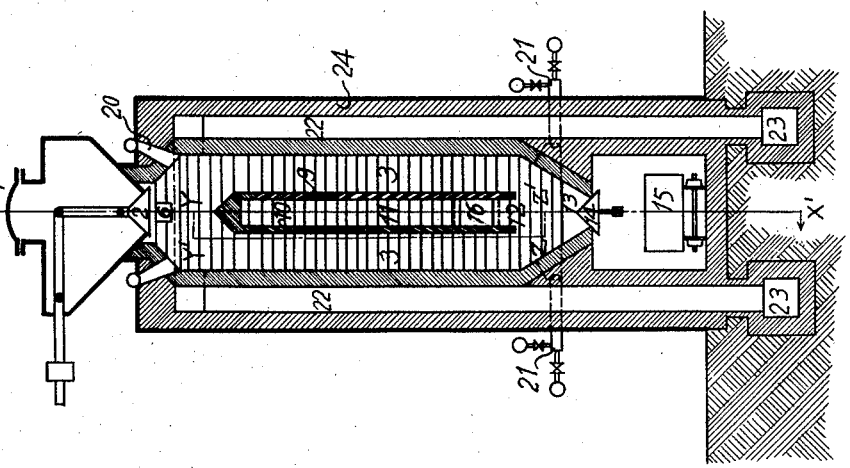

Referring to the accompanying drawings:

Figs. 1 to 3 show an example of a furnace in accordance with one embodiment of the invention; Fig. 1 is a vertical section, the left part of which (from the line S—S') shows a vertical section taken along the line X—X' of Fig. 2 and the right part shows a vertical section taken along the line X—Y—Y'—Z—Z'—X' of Fig. 2; Fig. 2 is a vertical section taken along the line A—A' of Fig. 1 and Fig. 3 is a vertical section taken along the line B—B' of Fig. 1.

Figure 6:
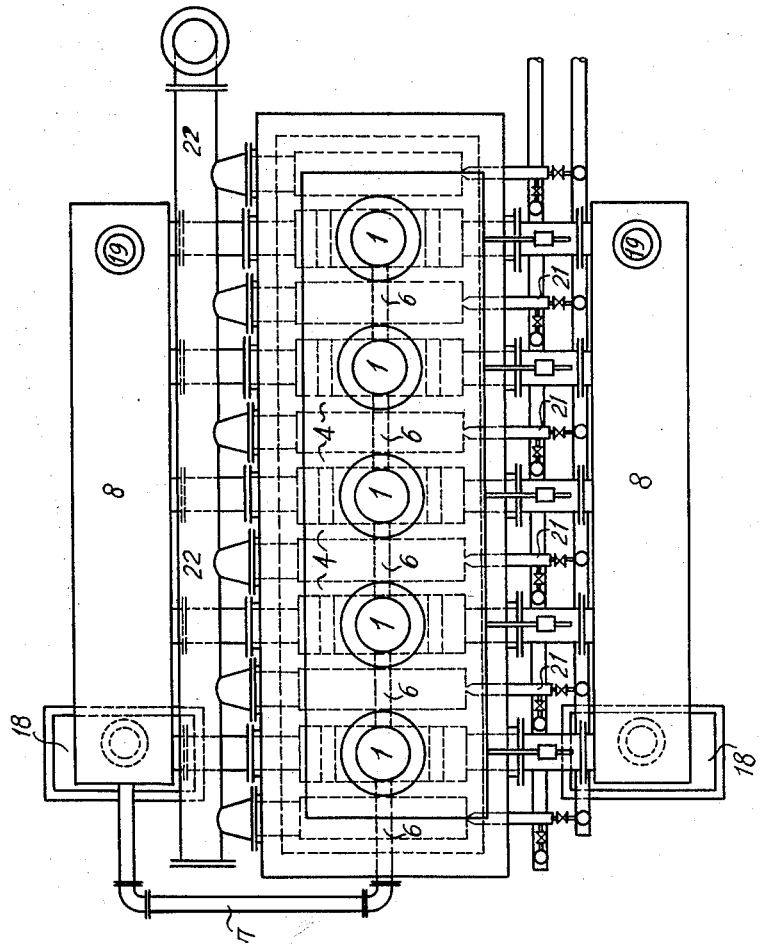

Figs. 4 to 6 show another example of a furnace; Fig. 4 is a vertical section taken along an extracting chamber and Fig. 5 is a vertical section taken along a heating chamber. Fig. 6 is a plan view.

As shown in Figs. 1 to 3, this furnace is composed of vertical sulphur extracting chambers 3 with collecting chambers 11 for sulphur vapor, heating chambers 5, surrounding walls 24, which are composed of refractory materials such as fire bricks. Sulphur extracting chambers 3 and heating chambers 5 are alternately arranged side by side and separated from each other by vertical refractory walls 4.

Each collecting chamber 11 in an extracting chamber 3 has vertical partitions 9 which have apertures 10 inclined toward the extracting chamber 3, and further has a conduit 16 for sulphur vapor at its middle or lower part.

Sulphurous ore is fed from entry ports 1 into each extracting chamber 3 through a bell 2 and is heated by the heat from the heating chamber 5. The moisture contained in the sulphureous ore evaporates at the preheating zone, i.e. the upper part of the extracting chambers 3, and is led, together with sulphur vapor, into the condenser 8 through the passage 6 and the duct 7. At the middle part of each sulphur extracting chamber 3, the sulphurous ore is heated to about 450° C., and the greater part of sulphur vaporizes, the vapor being led, through the inclined apertures 10 of the vertical partitions 9, into the collecting chamber 11. The apertures 10 allow the transit of sulphur vapor but prevent the sulphureous ore in the chambers 3 from falling into the collecting chambers 11. The side walls 4 of each chamber 3 have many horizontal ridges 26 which guide sulphur vapor from the sulphur ore to the apertures 10 with minimum friction.

Fine dust of sulphureous ore, accompanied by sulphur vapor and led into the collecting chamber 11, precipitates to the bottom of the collecting chamber, and falls down, through the bottom opening 12 of the collecting chamber, into the lower part of the extracting chamber 3 and is discharged together with the residue of sulphureous ore through the discharge part 13.

After the greater part of the sulphur is extracted, the sulphureous ore is heated up to 700° C.–750° C. at the lower part of the extracting chambers 3 and releases the rest of sulphur and is discharged as residue through the bell 14, which is operated automatically or manually. The residue is carried away by trucks 15 or a conveyer.

The sulphur vapor collected in the collecting chamber 11 passes alternately through the conduits 16 and the extracting chambers 3, and is led, through the duct 16', into the condenser 8 where it liquefies. The liquid sulphur is continuously or intermittently withdrawn by a siphon 17 and is received by a product receiver 18.

As heavy sulphur vapor at about 450° C. in the collecting chamber 11 has a tendency to descend and the light sulphur vapor at about 750° C. has a tendency to ascend, each collecting chamber has a conduit 16 for sulphur vapor at a suitable position in its central or lower part.

The outside surface of the condenser 8 is covered with a heat insulator so as to keep the temperature of the condenser above the melting point of sulphur. Uncondensed water vapor containing some sulphur vapor and other noncondensing gases is led from the condenser 8 through the duct 19 into a cooling chamber (not shown) in which the sulphur is recovered as sublimed sulphur.

Openings 20 are provided for inspecting the interiors of the extracting chambers 3 or for poking down sulphureous ore in the same.

Producer gas and air are fed through gas burners 21, into the bottom of the vertical heating chambers 5 for indirectly heating the extracting chambers 3. The waste gas from the heating chambers 5 is led through the flues 22, 23 to a chimney (not shown). Under certain circumstances, combustion products of other fuels may be led into the heating chambers 5.

In the example of this invention shown in Figs. 1 to 3, each extracting chamber 3 has one collecting chamber positioned at its vertical center line, but in the example shown in Figs. 4 to 6, each extracting chamber 3 has two collecting chambers 11, one at its front side and the other at its rear side, and each collecting chamber 11 is respectively connected to one of two condensers 8, one of which is installed in front of the furnace and the other of which is installed behind the furnace.

In the example shown in Figs. 1 to 3, each heating chamber 5 is a vertical chamber, but in the example shown in Figs. 4 to 6 each heating chamber 5 is provided with staggered horizontal baffles, and hot products of combustion are passed back and forth progressively in an upward direction.

The advantages of this furnace are explained as follows:

Because the feeding of sulphureous ore and the discharging of residue can be continuously executed, this furnace can be easily operated so that labor can be saved.

Because this furnace is constructed of refractory materials such as fire bricks, a durable furnace can be cheaply constructed.

Because the extracting chambers and the heating chambers are alternately arranged side by side, the volume of the furnace can be considerably reduced and a mass-production furnace can be cheaply constructed and high heat efficiency may be achieved.

Because each extracting chamber has one or two-collecting chambers, where the fine dust is removed, the product is free from dust and pure sulphur can be obtained.

Because this furnace can be operated at high temperatures, the productive capacity per unit volume of the furnace is large.

Because the side walls of each extracting chamber have many horizontal ridges on their inner surfaces and the walls of the collecting chambers have many inclined apertures, this furnace can also effectively treat fine or soil ore from which the extraction of sulphur has been considered to be difficult.

As mentioned above, this furnace offers many advantages for extraction of sulphur.

I claim:

1. A furnace for extracting sulphur comprising a rectangular housing defining an inner space, parallel vertical walls dividing the space into alternately arranged heating chambers with rectangular cross-sections and sulphur extracting chambers with rectangular cross-sections, said chambers having said vertical walls in common so that heat from said heating chambers is transferred directly through said vertical walls to the adjacent sulphur extracting chambers, each of said sulphur extracting chambers defining an entrance for the supply of sulphurous ore at its top and a discharge port at its bottom, vertical partitions in each sulphur extracting chamber defining at least one vertical vapor collecting chamber with a rectangular cross-section, said vertical partitions being fixed on and perpendicular to said vertical walls, said partitions having a plurality of inclined apertures directed upwardly from said sulphur extracting chamber to said collecting chamber, said partition being spaced from the bottom of said sulphur extracting chamber so as to communicate the lower part of said collecting chamber with the lower part of said sulphur extracting chamber and thus with the associated discharge port, and in each of said collecting chambers a conduit which opens no higher than the vertical center of said collecting chamber into the same, and extends laterally towards the outside of said housing.

2. A furnace for extracting sulphur comprising an upright rectangular housing defining an inside space parallel vertical walls dividing the space into alternately arranged heating chambers with rectangular cross-sections and sulphur extracting chambers with rectangular cross-sections, said chambers having said vertical walls in common so that heat from said heating chambers is transferred directly through said vertical walls to the adjacent sulphur extracting chambers, each of said sulphur extracting chambers defining an entrance for the supply of sulphurous ore at its top and a discharge port at its botttom, partitions in each sulphur extracting chamber defining a vertical collecting chamber with a rectangular cross-section, said partitions being fixed on and perpendicular to said vertical walls, said partitions defining a plurality of inclined apertures directed upwardly from said sulphur extracting chamber to said collecting chamber, the lower end of said partitions being spaced from the bottom of said sulphur extracting chamber so that said collecting chamber communicates with said discharge port.

3. A furnace for extracting sulphur comprising an upright rectangular housing defining inside space, parallel vertical walls dividing the space into alternately arranged heating chambers with rectangular cross-sections and sulphur extracting chambers with rectangular cross-sections, said chambers having said vertical walls in common so that heat from said heating chambers is transferred directly through said vertical walls to the adjacent sulphur extracting chambers, each of said sulphur extracting chambers defining an entrance for the supply of sulphurous ore at its top and a discharge port at its bottom, partitions in each sulphur extracting chamber defining two oppositely positioned vertical collecting chambers with rectangular cross-sections, said partitions being fixed on said vertical walls, said partitions defining a plurality of inclined apertures directed upwardly from said sulphur extracting chambers to said collecting chambers, the lower end of said partitions being spaced from the bottom of said sulphur extracting chamber so that the collecting chambers communicate with the discharge ports.

4. A furnace for extracting sulphur claimed in claim 1 in which the vertical walls arranged between the sulphur extracting chambers and the heating chambers comprise horizontal parallel ridges in said sulphur extracting chambers.

References Cited in the file of this patent
UNITED STATES PATENTS

| | | |
|---|---|---|
| 942,858 | Isbell | Dec. 7, 1909 |
| 996,829 | Behr | July 4, 1911 |
| 2,430,056 | Kent | Nov. 4, 1947 |
| 2,600,425 | Parry | June 17, 1952 |